UNITED STATES PATENT OFFICE.

GUY DE BECHI, OF PARIS, FRANCE.

PROCESS OF TREATING ZINC-BEARING COMPLEX ORES FOR RECOVERY OF ZINC OR OTHER METALS THEREFROM.

SPECIFICATION forming part of Letters Patent No. 656,497, dated August 21, 1900.

Application filed May 1, 1899. Serial No. 715,231. (No specimens.)

*To all whom it may concern:*

Be it known that I, GUY DE BECHI, chemical engineer, a subject of the King of Italy, residing at 17 Boulevard de la Madeleine, Paris, in the Republic of France, have invented certain new and useful Improvements in the Process for the Treatment of Zinc-Bearing Complex Ores for the Recovery of Zinc and other Metals Therefrom, of which the following is a specification.

This invention relates to a process for the treatment of zinc-bearing complex ores for the recovery of zinc and other metals therefrom. Heretofore much difficulty has been experienced in the extraction of the metals from such ores; and the chief object of my invention is to obviate this difficulty and to enable the metals to be extracted by a wet process, in which marketable zinc oxid or metallic zinc and other metals in the form of compounds capable of being readily reduced or converted into salable salts are obtained.

Another object of my invention is, while facilitating the roasting of the ore, to obtain useful and valuable by-products during such roasting, a part of which by-products may be employed in the carrying out of the process.

A further feature of my invention relates to the treatment of the impure zinc oxid obtained in order to economically reduce the same.

According to my invention I treat ores of the kind referred to in the following manner: The pulverized ore and sodium chlorid or other salt rich in alkaline chlorids are roasted separately, the gases proceeding from the roasted ore being caused to pass over or about and in contact with the said chlorid salt, or I may mix a small quantity of this salt with the ore before heating, the remainder of said salt being heated separately. The proportion of the quantity of salt mixed with the ore varies from five (5) to ten (10) parts, by weight, of sodium chlorid or its equivalent to one hundred (100) parts of ore, according to the nature or composition of the latter. This small proportion of sodium chlorid is not sufficient to render the mass pasty, and hence a dead roast of the ore can be obtained. Superheated steam is injected into the furnaces in suitable quantities. In roasting the ore excess of air is permitted to enter the furnace and sulfurous anhydrid ($SO_2$) is principally given off from the ore. Some of the sulfur of the ore is also converted directly into sulfuric anhydrid, ($SO_3$,) as is always the case when roasting common blende or pyrites, the quantity of sulfuric anhydrid thus formed varying directly as the amount of pyrites contained in the ore. Hydrochloric acid, chlorin, and sulfurous and sulfuric anhydrid are given off during the roasting of the ore and the chlorid salt. In cases where a small quantity of sodium chlorid is mixed with the ore probably some vaporized metallic salts will also be given off. On coming in contact with the sodium chlorid the sulfurous and sulfuric anhydrid in the presence of air and water (steam) combine with the sodium of the salt to form salt-cake, (sodium sulfate,) while further quantities of hydrochloric acid are produced. Thus:

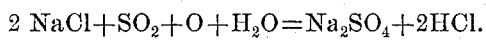

$$2\ NaCl + SO_2 + O + H_2O = Na_2SO_4 + 2HCl.$$

In the cases of ores that do not give off a sufficient quantity of sulfurous compounds to form the sodium sulfate I roast at the same time, either mixed with the ore or in a separate furnace, a quantity of pyrites sufficient to supply the required amount of sulfur according to the above equation. The iron contained in the pyrites also serves to facilitate the recovery of the lead by supplying the iron for the production of slag should the ore under treatment not contain a sufficient quantity of this metal. The gases and vapors, consisting mainly of hydrochloric acid passing off from the furnaces, are condensed in suitable condensing-towers. Some or all of the acidulated water from these towers containing the condensed gases and vapors is then utilized for leaching or lixiviating the roasted ore. By this lixiviation a solution of various metallic chlorids is obtained, according to the nature of the ore under treatment. If the roasted ore, as is generally the case, contains some soluble sulfate, liquor containing dissolved calcium chlorid (which liquor is obtained during my process, as will be hereinafter described) is added to the said acidulated water before leaching. The calcium chlorid precipitates the acid radical $SO_3$ as insoluble calcium sulfate. The calcium chlorid will also eliminate any sulfuric acid which the acidulated water may contain, so that the latter is converted into a fairly-pure hydrochloric-acid solution and the filtrate obtained from the subsequent lixiviation of the roasted ore with this solution then contains all the metals exclusively in the form of chlorids. The solution may contain a small quantity of silver chlorid, which is soluble to a slight extent in solutions containing large quantities of soluble chlorids. Thus the solution obtained may contain, for example, the chlorids of zinc, copper, silver, manganese, sodium, and calcium. As, however, it is better that the silver be retained wholly in the residue in an insoluble form, I convert the silver chlorid into sulfid (which is quite insoluble in a solution of metallic chlorids) by adding a very small quantity of lime and calcium sulfid to the said solution. The whole of the silver is thus precipitated in the form of sulfid and remains with the residue. This residue will now contain, say, lead, silver, gold, iron in the form of the insoluble subsalt or oxid, and a certain quantity of zinc, which will always remain in the residue, even when the hydrochloric acid is used in excess. If an excess of hydrochloric acid has been employed in the leaching fluid, iron may also be present in the solution as a chlorid, and in such case it may be removed by adding to this solution some fresh-roasted ore and lixiviating the same therewith, when the zinc of the zinc oxid contained in such ore will combine with the chlorin of the ferric chlorid, and the iron will be deposited in the form of the insoluble subsalt or hydrated oxid. This step will also neutralize the solution. In proceeding with the treatment of the solution if the precipitation of any silver chlorid contained therein has not been effected by the addition of lime and calcium sulfid this silver is first precipitated with copper or zinc and the remaining metals are successively separated by fractional precipitation with lime or other alkaline earth or with soda ash. For instance, supposing the solution to contain zinc chlorid, manganese chlorid, and cupric chlorid, then a quantitative analysis is made to determine the amount of cupric chlorid in the solution and sufficient lime is added to act upon the chlorin of such salt, and thus separate the copper as a hydrate. As the lime will not attack the other chlorids until all the cupric chlorid is decomposed and as only sufficient lime is added to decompose this chlorid, none of the other metals are separated at this stage. The solution is then filtered and the filtrate is similarly treated for the separation of the zinc, and subsequently, if it be desired to do so, further similarly treated to separate the manganese. This separation of the metals by fractional precipitation is based upon the thermo-chemical data relative to the formation of the oxids of the metals, those metallic oxids liberating the least amount of heat on formation being first precipitated by the addition of only sufficient lime for that purpose, as above explained. For example, the amount of heat evolved by the combination of copper with oxygen is less than the amount of heat evolved by the combination of zinc with oxygen, so that if to one liter of a solution containing sixty-five grams of zinc and sixty-three grams of copper as chlorids there be added milk of lime containing fifty-six grams of pure lime (CaO) the precipitate produced will contain only copper hydrate, ($CuO_2H_2$.) If then a further addition of milk of lime containing fifty-six grams of lime (CaO) be made to the solution, the zinc will be precipitated as zinc hydrate, ($ZnO_2H_2$.) To further illustrate the reaction, if to a solution containing sixty-five grams of zinc in the form of zinc chlorid there be added fifty-six grams of lime to produce zinc hydrate and then this zinc hydrate be added to a solution containing sixty-three grams of copper as copper chlorid a reaction will take place, with the production of a solution of zinc chlorid and a precipitate of copper hydrate. The metals will thus be precipitated in the form of hydrates or hydrated oxids, which is a very convenient form for producing the salts of said metals. If, for example, the copper is required in the form of copper sulfate, the hydrate of copper is dissolved in sulfuric acid and copper sulfate crystallized out from the solution in the well-known manner. Zinc salts may be similarly obtained by dissolving the hydrate of zinc in an appropriate acid.

When the hydrate of zinc is to be reduced by retorting, I find it advisable or necessary to subject the same to a special treatment, because the hydrate obtained in the manner above set forth contains insoluble oxychlorids of zinc or of lime, or both, and it is practically impossible to eliminate the oxychlorids by washing. By moderately heating the hydrate the combined water is driven off and a more or less impure zinc oxid is produced. This oxid is, however, very light or of a low density, and is therefore incapable of being economically reduced in retorts to metallic zinc. Moreover, when oxychlorids are present, fumes are liberated during the reducing process, which fumes are not only very deleterious to the workmen employed, but also carry away some of the zinc, which is thus lost. To transform that impure hydrated zinc oxid into a practically or commercially pure zinc oxid of sufficient density to render it capable of being economically reduced on a large scale, I first wash and dry the said hydrate and then heat the same in a suitable furnace such as a muffle-furnace. The combined water is first given off, and when the oxid is heated to a bright redness the oxychlorids are decomposed, liberating the combined chlorin and fumes of zinc and zinc compounds. The fumes are conducted to a condensing-tower wherein the zinc is dissolved in a weak solution of hydrochloric acid, from which it is subsequently recovered in any suitable manner. From seven per cent. to ten per cent. of the zinc contained in the hydrate will be carried off by these fumes, and practically the whole of this is recovered in the condensing-tower. The completion of this part of the process may be recognized by the cessation of the liberation of fumes or by testing a portion of the contents of the furnace for chlorin. I sometimes pass a current of air and steam through the furnace to accelerate the process. The calcined residue consists of nearly pure zinc oxid, which I then subject to pressure in a suitable device, so as to greatly increase its density. The compressed product is broken or pulverized before being inserted into the retorts together with the reducing agent, and it will preserve its increased density when so broken. I prefer, however, to first mix the necessary proportion of reducing agent, say carbon in the form of anthracite, with the calcined zinc oxid and then to compress the mixture. A more intimate mixture of the oxid with the reducing agent can thus be obtained, and, moreover, it is thereby possible to reduce a much greater quantity of zinc oxid with one charge of the furnace or retorts. The residue remaining after the leaching of the roasted ore, which contains practically the whole of the lead and silver of the ore, as well as any gold that may be present and a certain quantity of zinc, as previously explained, is treated in a cupola or other suitable furnace, and a lead bullion thus obtained, which contains practically all the lead, silver, and gold in the ore. During this treatment a certain quantity of lead and nearly all the zinc remaining in the residue are volatilized and driven off as fumes and are condensed in suitable chambers or towers. The product of such condensation is added to fresh-roasted ore prior to the leaching thereof. The zinc is dissolved in the form of chlorid and the lead again remains in the insoluble residue. The last filtrate remaining after the separation of the metals contains a large quantity of dissolved calcium chlorid. This liquid can be employed for eliminating from the roasted ore or from the leaching liquid any soluble sulfates or sulfuric acid, as previously explained.

I do not lay claim to any of the hereinbefore-described reactions by themselves, but only to the combinations of these reactions in the manner hereinafter specifically claimed and for the purpose specified.

What I claim is—

1. The method of treating complex zinc ores for the recovery therefrom of copper, zinc and lead, consisting in separately roasting the ore and an alkali chlorid in the presence of air and steam, conveying the sulfurous and sulfuric vapors thus derived from the ore over and in contact with the said chlorid during the roasting to obtain hydrochloric-acid fumes, condensing the acid fumes, lixiviating the roasted ore with the acid liquor thus obtained to produce a solution of metallic chlorids, and successively precipitating the metals of the metallic chlorids as hydrates by successive additions of alkali, substantially as described.

2. The method of treating complex zinc ores for the recovery therefrom of copper, zinc and lead, consisting in roasting the ore in the presence of air and steam with a quantity not exceeding ten per cent. by weight of an alkali chlorid, and separately roasting a further quantity of said chlorid, conducting the fumes from the roasted ore over and in contact with the chlorid during the roasting to obtain hydrochloric-acid fumes, condensing the acid fumes, lixiviating the ore with the acid liquor thus obtained to produce a solution of metallic chlorids, and successively precipitating the metals of the metallic chlorids as hydrates by successive additions of alkali, substantially as described.

3. The method of treating complex zinc ores for the recovery therefrom of copper, zinc and lead, consisting in separately roasting the ore and an alkali chlorid in the presence of air and steam, conveying the sulfurous and sulfuric vapors thus derived from the ore over and in contact with the said chlorid during the roasting to obtain hydrochloric-acid fumes; condensing the acid fumes, lixiviating the roasted ore with the acid liquor thus obtained to produce a solution of metallic chlorids, and successively precipitating the metals of the metallic chlorids as hydrates by successive additions of lime, substantially as described.

4. The method of treating complex zinc ores for the recovery of copper, zinc and lead, consisting in roasting the ore mixed with pyrites, and separately roasting an alkali chlorid in the presence of steam and air, conveying the sulfurous and sulfuric vapors thus derived from the ore over and in contact with the chlorid during the roasting to obtain hydrochloric-acid fumes, condensing the acid fumes, lixiviating the roasted ore with the acid liquor thus obtained to produce a solution of metallic chlorids, and successively precipitating the metals of the metallic chlorids as hydrates by successive additions of lime, substantially as described.

5. The method of treating complex zinc ores for the recovery therefrom of copper, zinc and lead, consisting in separately roasting the ore and an alkali chlorid in the presence of air and steam, conveying the sulfurous and sulfuric vapors thus derived from the ore over and in contact with the said chlorid during the roasting to obtain hydrochloric-acid fumes, condensing the acid fumes, eliminating any sulfuric acid from the acid liquor thus obtained, eliminating any soluble sulfate from the roasted ore, lixiviating the roasted ore with the acid liquor thus obtained to produce a solution of metallic chlorids, and successively precipitating the metals of the metallic chlorids as hydrates by successive additions of alkali, substantially as described.

6. The method of treating complex zinc ores for the recovery therefrom of copper, zinc, and lead, consisting in separately roasting the ore and an alkali chlorid in the presence of air and steam, conveying the sulfurous and sulfuric vapors thus derived from the ore over and in contact with the said chlorid during the roasting to obtain hydrochloric-acid fumes, condensing the acid fumes in water, eliminating any sulfuric acid from the acid-water and eliminating any soluble sulfate from the roasted ore as insoluble calcium sulfate by the addition of a solution of calcium chlorid, lixiviating the ore with the acid liquor to obtain a solution of metallic chlorids, and successively precipitating the metals of the metallic chlorids as hydrates by successive additions of lime, substantially as described.

7. The method of treating complex zinc ores for the recovery therefrom of copper, zinc and lead, consisting in separately roasting the ore and an alkali chlorid in the presence of air and steam, conveying the sulfurous and sulfuric vapors thus derived from the ore over and in contact with the said chlorid during the roasting to obtain hydrochloric-acid fumes, condensing the acid fumes in water, eliminating any sulfuric acid from the acid-water and eliminating any soluble sulfate from the roasted ore as insoluble calcium sulfate by the addition thereto of a solution of calcium chlorid, lixiviating the ore with the acid liquor to obtain a solution of metallic chlorids, precipitating any silver from the solution as insoluble silver sulfid by the addition of lime and calcium sulfid, precipitating any iron from the solution as insoluble hydrated ferric oxid by the addition of some fresh-roasted zinc ore, and then precipitating first the copper and then the zinc from the chlorid solution as hydrates, by the successive additions of lime, substantially as described.

8. The method of treating complex zinc ores for the recovery therefrom of copper, zinc, and lead, consisting in separately roasting the ore and an alkali chlorid in the presence of air and steam, conveying the sufurous and sulfuric vapors thus derived from the ore over and in contact with the said chlorid during the roasting to obtain hydrochloric-acid fumes, condensing the acid fumes in water, eliminating any sulfuric acid from the acid-water and eliminating any soluble sulfate from the roasted ore as insoluble calcium sulfate by the addition thereto of a solution of calcium chlorid, lixiviating the ore with the acid liquor to obtain a solution of metallic chlorids, and successively precipitating the metals of the metallic chlorids as hydrates by successive additions of lime, heating the zinc hydrate thus obtained in presence of air to drive off any combined chlorin, compressing the calcined residue of zinc oxid and retorting the same in the presence of carbon, substantially as described.

9. The method of treating complex zinc ores for the recovery therefrom of copper, zinc, and lead, consisting in separately roasting the ore and an alkali chlorid in the presence of air and steam, conveying the sulfurous and sulfuric vapors thus derived from the ore over and in contact with the said chlorid during the roasting to obtain hydrochloric-acid fumes, condensing the acid fumes in water, eliminating any sulfuric acid from the acid-water and eliminating any soluble sulfate from the roasted ore as insoluble calcium sulfate by the addition thereto of a solution of calcium chlorid, lixiviating the ore with the acid liquor to obtain a solution of metallic chlorids, and successively precipitating the metals of the metallic chlorids as hydrates by successive additions of lime, heating the zinc hydrate thus obtained in presence of air to drive off any combined chlorin, condensing any zinc that may be driven off with the chlorin, mixing the residue of calcined zinc oxid with carbon and compressing the mixture to increase its density, and then retorting the compressed mixture, substantially as described.

In testimony whereof I have hereunto set my hand, in presence of two subscribing witnesses, this 19th day of April, 1899.

GUY DE BECHI.

Witnesses:
H. ASHBY NORRIS,
J. COLLINS.